(12) United States Patent
Mitta et al.

(10) Patent No.: US 8,691,888 B2
(45) Date of Patent: Apr. 8, 2014

(54) VINYL CHLORIDE RESIN EMULSION, AQUEOUS INK, AND RECORDING SHEET

(75) Inventors: Yasuhiro Mitta, Echizen (JP); Yuji Gama, Echizen (JP)

(73) Assignee: Nissin Chemical Industry Co., Ltd., Echizen-shi (JP)

(*) Notice: Subject to any disclaimer, the term of this patent is extended or adjusted under 35 U.S.C. 154(b) by 256 days.

(21) Appl. No.: 12/933,277

(22) PCT Filed: Jun. 3, 2010

(86) PCT No.: PCT/JP2010/059418
§ 371 (c)(1),
(2), (4) Date: Sep. 17, 2010

(87) PCT Pub. No.: WO2010/140647
PCT Pub. Date: Dec. 9, 2010

(65) Prior Publication Data
US 2011/0124801 A1    May 26, 2011

(30) Foreign Application Priority Data
Jun. 4, 2009  (JP) ................................ 2009-135220

(51) Int. Cl.
*C09D 11/10*    (2006.01)
(52) U.S. Cl.
USPC ........................................ 523/160; 523/161
(58) Field of Classification Search
USPC ........................................................ 523/160
See application file for complete search history.

(56) References Cited

U.S. PATENT DOCUMENTS

| 4,279,653 | A | 7/1981 | Makishima et al. |
| 4,647,612 | A | 3/1987 | Ranka et al. |
| 5,147,926 | A | 9/1992 | Meichsner et al. |
| 5,981,642 | A * | 11/1999 | Overbeek et al. .............. 524/457 |
| 2003/0107632 | A1* | 6/2003 | Arita et al. ..................... 347/100 |
| 2007/0167595 | A1 | 7/2007 | Noguchi et al. |

FOREIGN PATENT DOCUMENTS

| JP | 53-061412 A | 6/1978 |
| JP | 54-089811 A | 7/1979 |
| JP | 55-051583 A | 4/1980 |
| JP | 55-065269 A | 5/1980 |
| JP | 56-084992 A | 7/1981 |
| JP | 56-148584 A | 11/1981 |
| JP | 58-024493 A | 2/1983 |
| JP | 61-235478 A | 10/1986 |
| JP | 62-288076 A | 12/1987 |
| JP | 2-238015 A | 9/1990 |
| JP | 4-335039 A | 11/1992 |
| JP | 8-253716 A | 10/1996 |
| JP | 9-012956 A | 1/1997 |
| JP | 10-176132 A | 6/1998 |
| JP | 10-279879 A | 10/1998 |
| JP | 11-035866 A | 2/1999 |
| JP | 11-123867 A | 5/1999 |
| JP | 2001-199152 A | 7/2001 |

OTHER PUBLICATIONS

Extended European Search Report dated Sep. 20, 2012, issued in corresponding European patent application No. 10783429.3.

* cited by examiner

*Primary Examiner* — Doris Lee
(74) *Attorney, Agent, or Firm* — Westerman, Hattori, Daniels & Adrian, LLP

(57) ABSTRACT

A vinyl chloride resin emulsion is obtained from emulsion polymerization of (A) 40-500 parts by weight of a styrene-acrylic acid ester oligomer and/or acrylic acid ester oligomer having a number average molecular weight of 5,000-50,000 with 100 parts by weight of a monomeric composition comprising (B) a vinyl chloride monomer or (B) a vinyl chloride monomer and (C) an ethylenically unsaturated monomer copolymerizable therewith.

10 Claims, No Drawings

VINYL CHLORIDE RESIN EMULSION, AQUEOUS INK, AND RECORDING SHEET

TECHNICAL FIELD

This invention relates to a vinyl chloride resin emulsion which may be advantageously utilized as a binder for ink, paint, inorganic dispersion or the like, a receiving layer for recording sheets, a fabric treating agent and the like. More particularly, it relates to a vinyl chloride resin emulsion which exhibits excellent water resistance, humidity resistance, high gloss, and alcohol resistance when used in aqueous ink, and excellent color development, humidity resistance, color visual perception, and high gloss when used in recording sheets.

BACKGROUND ART

Reference is first made to gravure printing ink. In general printing, printing quality depends on the printability and printing effect of printing ink. The printability is a set of properties relating to a behavior of ink from transfer of ink on a printing machine to an object to be printed to completion of a printed surface, the properties mainly including fluidity, interfacial compatibility and drying of ink. On the other hand, the printing effect is the finish of printing that the ink having formed a printed surface develops, including such properties as color tone, gloss, water resistance, blocking resistance and the like. Ink is basically composed of a coloring matter (dye or pigment), vehicle, and auxiliary agents (flow adjusting agents, drying adjusting agents, etc.). Of these, the vehicle has the most impact on the printability and printing effect. The vehicle is basically composed of a binder, wax, solvent and the like. By a choice of the binder, the nature of the vehicle is substantially changed, on which the printability and printing effect largely depend.

The binders are generally classified into solvent binders and aqueous binders. The solvent binders include urethane resins as proposed in JP-A H09-12956 (Patent Document 1). Nowadays, however, the considerations of air pollution, fire risk and working hygiene turn attention to the aqueous binders not using organic solvents.

The aqueous binders are generally divided into alkali soluble resins as typified by styrene-acrylic resins, water-soluble resins as typified by polyvinyl alcohol, and water-dispersed resins as typified by urethane emulsions (Patent Document 2: JP-A H02-238015) and acrylic emulsions.

In general, in the case of printing using an aqueous ink comprising a water-dispersed resin as the binder, the ink is applied onto a printing area of a printer at room temperature, and thereafter finished by drying at or above the glass transition temperature of the water-dispersed resin. When heated at or above the glass transition temperature, overall resin particles fuse together to form a uniform film which develops and improves water resistance. With an attention paid to drying on the printer among printability factors, the printing ink must maintain fluidity on the printer for a time as long as possible without drying. In this regard, the solvent type resin, alkali-soluble resin and water-soluble resin are non-problematic in that even if the resin once becomes a dry film, the resin resumes original fluidity when dissolved in solvent, alkaline aqueous solution or water, whereas the water-dispersed resin is problematic in that once the resin is dry so that resin particles fuse together at their surface, the resin does not resume fluidity even when contacted with water, leading to a failure of printing. On the other hand, the alkali soluble resin has a problem of poor alkali resistance and the water-soluble resin has a problem of poor water resistance. Then conventional binders are sometimes prepared by combining the alkali-soluble resin or water-soluble resin with the water-dispersed resin. In the state-of-the-art, an attempt to improve printability encounters a loss of alkali or water resistance while an attempt to improve alkali or water resistance leads to insufficient printability.

To solve the problem, JP-A H10-176132 (Patent Document 3) proposes a binder for aqueous ink comprising a monomer selected from vinyl chloride, an alkyl (meth)acrylate having an alkyl moiety of 1 to 18 carbon atoms, and a monoalkenylbenzene, and another ethylenically unsaturated monomer having a functional group. However, problems remain with respect to humidity resistance and gloss.

Also fluoroplastics are proposed in Patent Document 4: JP-A H11-35866. Although fluoroplastics are excellent in many aspects including weather resistance and corrosion resistance, a cost problem is inevitably left unsolved.

Reference is now made to inkjet ink. The inkjet recording system is excellent in quiet, recording speed, setting quality and running cost, and is generally on widespread use. For use in this system, an aqueous ink is selected from the aspects of ink physical properties, safety, and ease of handling. Ink compositions having a water-soluble dye such as an acidic dye, direct dye or basic dye, dissolved in a glycol solvent and water are known from Patent Documents 5 to 7: JP-A S53-61412, JP-A S54-89811, and JP-A S55-65269. They have the drawback of poor water resistance.

Thus the use of pigments as the coloring component is under investigation. To disperse the pigment, acrylic resins or styrene-acrylic resins having carboxyl groups incorporated therein (Patent Document 8: JP-A S61-235478) and aqueous resins in the form of ternary copolymers of acrylic acid, styrene and α-methylstyrene (Patent Document 9: JP-A H08-253716) are used. Although improvements in water resistance and weather resistance are noticeable, there is left a room for improvement in dispersion (change with time) of pigments.

Next, reference is made to the receiving layer of recording sheets, especially of inkjet recording sheets. Currently the recording system using aqueous ink is often employed in the printer in the business machine system including personal computers, and accordingly the demand for recording material suited for that system is increasing. Meanwhile, a recording material having better characteristics is required in order to achieve further improvements in quality, colorfulness, appearance and definition of printed images. The recording material is used in diversified applications while requirements of properties such as water resistance and color development become increasingly stricter. The receiving layer is proposed in a recording sheet in which amorphous silica and a polymeric binder such as polyvinyl alcohol are combined and coated on a base paper (Patent Document 10: JP-A S55-51583) and a recording sheet comprising a base paper provided on front and back surfaces with an ink receiving layer containing porous pigment particles (Patent Document 11: JP-A S56-148584). Although a significant improvement in colorfulness or sharpness is achieved as compared with conventional recording sheets using wood-free paper, these receiving layers have the problems that a reduced coating weight allows for irregular spread of ink, resulting in printed images with substantial bleeding and that with an increased coating weight, bleeding is reduced, but the coating layer tends to spall off, causing dusting.

Patent Document 12: JP-A S62-288076 proposes a recording sheet in which binding strength is improved using a water-insoluble resin obtained from reaction of polyvinyl alcohol with acrylic acid and methyl methacrylate. Since this water-insoluble resin is anionic, fixation of an aqueous ink which is also anionic is adversely affected, failing to provide a solution capable of preventing ink bleeding or improving water resistance.

Further proposed are a recording sheet comprising a polycation polymeric electrolyte (Patent Document 13: JP-A S56-84992), a recording sheet comprising an ink receiving layer composed mainly of an ink-adsorbing cationic polymer binder (Patent Document 14: JP-A S58-24493), and a recording sheet comprising a cationic acrylic resin emulsion (Patent Documents 15 and 16: JP-A H11-123867 and JP-A 2001-199152). These proposals are not necessarily satisfactory with respect to color development and water resistance.

DISCLOSURE OF THE INVENTION

Problems to be Solved by the Invention

An object of the invention, which has been made under the above-mentioned circumstances, is to provide a vinyl chloride resin emulsion which exhibits excellent water resistance, humidity resistance, high gloss, and alcohol resistance when used in aqueous ink, and excellent color development, water resistance, humidity resistance, color visual perception, and high gloss when used in recording sheets, and which may be advantageously utilized as a binder for ink, paint, inorganic dispersion or the like, a receiving layer for recording sheets, a fabric treating agent and the like.

Means for Solving the Problems

Making extensive investigations to attain the above object, the inventors have found that the outstanding problems can be overcome by a vinyl chloride resin emulsion which is obtained from emulsion polymerization of (A) 40 to 500 parts by weight of a styrene-acrylic acid ester oligomer and/or acrylic acid ester oligomer having a number average molecular weight of 5,000 to 50,000, with 100 parts by weight of a monomeric composition comprising (B) a vinyl chloride monomer or (B) a vinyl chloride monomer and (C) an ethylenically unsaturated monomer copolymerizable therewith. The present invention is predicated on this finding.

Accordingly, the invention is defined as follows.
Claim 1:
A vinyl chloride resin emulsion obtained from emulsion polymerization of (A) 40 to 500 parts by weight of a styrene-acrylic acid ester oligomer and/or acrylic acid ester oligomer having a number average molecular weight of 5,000 to 50,000 with 100 parts by weight of a monomeric composition comprising (B) a vinyl chloride monomer or (B) a vinyl chloride monomer and (C) an ethylenically unsaturated monomer copolymerizable therewith.
Claim 2:
The vinyl chloride resin emulsion of claim 1 wherein a proportion of component (B) to component (C) is at least 50:up to 50 in weight ratio.
Claim 3:
An aqueous ink composition comprising the vinyl chloride resin emulsion of claim 1 or 2.
Claim 4:
The aqueous ink composition of claim 3 wherein the vinyl chloride resin emulsion is present in an amount of 2 to 30% by weight as solids, the composition further comprising 3 to 40% by weight of a colorant, 0 to 60% by weight of a water-soluble organic solvent, and 5 to 95% by weight of water.

Claim 5:
A recording sheet comprising a coating of the vinyl chloride resin emulsion of claim 1 or 2.
Claim 6:
The recording sheet of claim 5 wherein said coating forms a receiving layer.
Claim 7:
The recording sheet of claim 5 or 6 wherein said coating is formed of a composition comprising 2 to 30% by weight as solids of the vinyl chloride resin emulsion, 0 to 30% by weight of a pigment, and the balance of water or a water-soluble organic solvent.

Advantageous Effects of Invention

The vinyl chloride resin emulsion of the invention may be advantageously utilized as a binder for ink, paint, inorganic dispersion or the like, a receiving layer for recording sheets, a fabric treating agent and the like since the emulsion exhibits excellent water resistance, humidity resistance, high gloss, and alcohol resistance when used in aqueous ink, and excellent color development, water resistance, humidity resistance, color visual perception, and high gloss when used in recording sheets.

BEST MODE FOR CARRYING OUT THE INVENTION

The vinyl chloride base binder for aqueous ink according to the invention is a vinyl chloride resin emulsion obtained from emulsion polymerization of (A) 40 to 500 parts by weight of a styrene-acrylic acid ester oligomer and/or acrylic acid ester oligomer having a number average molecular weight of 5,000 to 50,000 with 100 parts by weight of a monomeric composition comprising (B) a vinyl chloride monomer or (B) a vinyl chloride monomer and (C) an ethylenically unsaturated monomer copolymerizable therewith.

The styrene-acrylic acid ester oligomer and acrylic acid ester oligomer (A) are derived from acrylic acid ester monomers which include methyl (meth)acrylate, ethyl (meth)acrylate, and butyl (meth)acrylate. As used herein, the term "(meth)acrylic" refers to both acrylic and methacrylic. Commercially available are JONCRYL JDX-6500, JONCRYL JDX-6102B, JONCRYL HPD-96J, and JONCRYL 52J (all from BASF AG). The monomers are not limited thereto while they may be used alone or in admixture of two or more. The amount of the oligomer used is preferably 40 to 500 parts by weight and more preferably 100 to 300 parts by weight relative to 100 parts by weight of a monomeric composition comprising (B) a vinyl chloride monomer or (B) a vinyl chloride monomer and (C) an ethylenically unsaturated monomer copolymerizable therewith. Less than 40 parts by weight may give rise to problems like formation of agglomerates, whereas more than 500 parts by weight may rive rise to problems such as inactivated reaction and a failure of consistent production.

The styrene-acrylic acid ester oligomer and acrylic acid ester oligomer (A) preferably has a number average molecular weight of 5,000 to 50,000 and more preferably 8,000 to 20,000. A molecular weight of less than 5,000 may give rise to problems like formation of agglomerates, whereas a molecular weight in excess of 50,000 may give rise to problems like mass formation of agglomerates and at worst, gelation. It is noted that the number average molecular weight is as measured by gel permeation chromatography (GPC) versus polystyrene standards. In the disclosure, those compounds having a number average molecular weight of up to 50,000 are referred to as oligomers.

Examples of the ethylenically unsaturated monomer (C) copolymerizable with vinyl chloride monomer include vinyl acetate, ethylene, propylene, and vinylidene chloride, as well as vinyl carboxylate monomers such as vinyl propionate; aromatic vinyl monomers such as styrene and α-methylstyrene; conjugated diene monomers such as 1,3-butadiene and 2-methyl-1,3-butadiene; ethylenically unsaturated monocarboxylic acid esters such as methyl acrylate, ethyl acrylate, butyl acrylate, 2-ethylhexyl acrylate, and methyl methacrylate; ethylenically unsaturated polycarboxylic acid esters such as dimethyl itaconate, diethyl maleate, monobutyl maleate, monoethyl fumarate, and dibutyl fumarate; ethylenically unsaturated monocarboxylic acids such as acrylic acid, methacrylic acid, and crotonic acid; ethylenically unsaturated dicarboxylic acids such as itaconic acid, maleic acid and fumaric acid; epoxy-containing monomers such as glycidyl methacrylate; alcoholic hydroxyl-containing monomers such as 2-hydroxyethyl methacrylate; alkoxyl-containing monomers such as methoxyethyl acrylate; nitrile-containing monomers such as acrylonitrile; amide-containing monomers such as acrylamide; amino-containing monomers such as dimethylaminoethyl methacrylate; and monomers having at least two ethylenically unsaturated groups in the molecule, such as divinyl benzene and allyl methacrylate. One or more may be selected from the foregoing examples. Inter alia, vinyl acetate, ethylenically unsaturated monocarboxylic acid esters, and ethylenically unsaturated monocarboxylic acids are preferred.

A proportion of vinyl chloride monomer (B) to copolymerizable ethylenically unsaturated monomer (C) is preferably between 50:50 and 100:0, more preferably between 70:30 and 100:0, in weight ratio. Too low a proportion of vinyl chloride may lead to the disadvantage of formation of agglomerates.

For the emulsion polymerization, any well-known emulsion polymerization techniques may be used. The monomers and polymerization aids (e.g., emulsifiers such as alkyl sulfate ester salts, polymerization initiators such as ammonium persulfate, chain transfer agents such as mercaptans, pH adjusting agents such as sodium carbonate, and defoamers) may be initially added in a lump or continuously added, or some may be added continuously or in divided portions during polymerization.

A nonionic surfactant or anionic emulsifier may be used together insofar as the desired effects of the invention are not compromised. Exemplary surfactants include polyoxyethylene alkyl phenyl ethers, polyoxyethylene alkyl ethers, polyoxyethylene fatty acid esters, sorbitan fatty acid esters, polyoxyethylene sorbitan fatty acid esters, polyoxyalkylene alkyl ethers, polyoxyethylene derivatives, glycerol fatty acid esters, polyoxyethylene-hardened castor oil, polyoxyethylene alkyl amines, alkyl alkanol amides, or acetylene alcohol, acetylene glycol and ethylene oxide adducts thereof.

Examples of the polymerization initiator used in the emulsion polymerization include persulfate salts such as ammonium persulfate and potassium persulfate; azo compounds such as 2,2'-diamidino-2,2'-azopropane dihydrochloride salt and azobisisobutyronitrile; peroxides such as cumene hydroperoxide, benzoyl peroxide, and hydrogen peroxide; and tartaric acid. Also useful are well-known redox initiators such as potassium persulfate and sodium hydrogen sulfite. An amount of the polymerization initiator used is generally 0.1 to 2.0% by weight, preferably 0.2 to 1.0% by weight based on the monomers.

The temperature at which emulsion polymerization is carried out is generally in the range of 40 to 80° C., desirably 50 to 70° C. The polymerization time may be determined as appropriate, although it is preferably 10 to 15 hours. Polymerization is desirably carried out in an inert gas atmosphere such as nitrogen gas.

The residue on evaporation is preferably 10 to 50% by weight, more preferably 20 to 40% by weight. If the residue is less than 10% by weight, agglomerates may form. If the residue to more than 50% by weight, a large amount of agglomerates may form.

It is noted that at the end of polymerization, a plasticizer, inorganic or organic filler, thickener and the like may be added insofar as the performance of the aqueous ink binder is not compromised.

There may be obtained an emulsion having an average particle size of 10 to 1,000 nm, preferably 20 to 800 nm, and a viscosity of 5 to 1,800 mPa-s.

While the resin emulsion may be used in a variety of applications, it exhibits excellent color development, water resistance, humidity resistance, and high gloss when used in recording sheets, and excellent water resistance, humidity resistance, color visual perception, high gloss, and alcohol resistance when used in aqueous ink.

In one embodiment wherein the vinyl chloride resin emulsion is used in aqueous ink, an ink composition may be prepared by blending the vinyl chloride resin emulsion with a colorant, a water-soluble organic solvent, various additives, water and the like, and dispersing and mixing on a well-known dispersing machine, mixer, kneader or mill. The content of the vinyl chloride resin emulsion in the aqueous ink composition is preferably 2 to 30% by weight, more preferably 5 to 20% by weight, calculated as solids. The colorant used herein may be dyes, pigments or the like, and is preferably present in an amount of 3 to 40% by weight, more preferably 5 to 30% by weight of the aqueous ink composition. Examples of the water-soluble organic solvent include ethylene glycol monoether, diethylene glycol monoether, propylene glycol monoether, ethylene glycol dimethyl ether, diethylene glycol dimethyl ether, ethylene glycol, diethylene glycol, propylene glycol, glycerol, methanol, ethanol, isopropyl alcohol, methyl ethyl ketone, methyl cellosolve, ethyl cellosolve, acetone, ethyl acetate, and diacetone alcohol. The water-soluble organic solvent is preferably present in an amount of 0 to 60% by weight, more preferably 0 to 50% by weight of the aqueous ink composition. Water is preferably present in an amount of 5 to 95% by weight, more preferably 5 to 93% by weight, and even more preferably 10 to 90% by weight of the aqueous ink composition. Suitable additives include pigment dispersants, leveling agents, defoamers and the like, and these additives may be added in standard amounts commonly used in aqueous ink.

In the other embodiment wherein the vinyl chloride resin emulsion is used in recording sheets, it is advantageously used to form a receiving layer on recording sheets. A composition which is used to form the receiving layer may be prepared by blending the vinyl chloride resin emulsion with a pigment, a water-soluble organic solvent, various additives, water and the like, and dispersing and mixing on a well-known dispersing machine, mixer, kneader or mill. The content of the vinyl chloride resin emulsion in the receiving layer-forming composition is preferably 2 to 30% by weight, more preferably 5 to 20% by weight, calculated as solids. Examples of the pigment which can be compounded herein include amorphous synthetic silica, aluminum silicate, magnesium silicate, precipitated calcium carbonate, heavy calcium carbonate, calcium silicate, aluminum hydroxide, zeolite, fired clay, kaolin clay, talc, and white carbon. The pigment is preferably present in an amount of 0 to 30% by weight, more preferably 0 to 20% by weight. Examples of the water-soluble organic solvent include ethylene glycol monoether, diethylene glycol monoether, propylene glycol monoether, ethylene glycol dimethyl ether, diethylene glycol dimethyl ether, ethylene glycol, diethylene glycol, propylene glycol, glycerol, methanol, ethanol, isopropyl alcohol, methyl ethyl ketone, methyl cellosolve, ethyl cellosolve, acetone, ethyl acetate, and diacetone alcohol. The water-soluble organic solvent is preferably present in an amount of 0 to 60% by weight, more preferably 0 to 50% by weight of the aqueous ink composition. Water is preferably present in an amount of 5 to 98% by weight, more preferably 10 to 90% by weight of the aqueous ink composition. Other additives which can be compounded herein include pigment dispersants, defoamers, colorants, antioxidants, UV absorbers, viscosity adjusting agents, parting agents and the like.

The receiving layer-forming composition may be applied onto a substrate, typically commercially available paper, by a suitable coating means such as a brush, blade coater, air knife coater, curtain coater, Mayer bar coater, gravure coater, or roll coater and dried so as to provide a coating weight of 0.5 to 25 g/m$^2$, preferably 1 to 10 g/m$^2$, calculated as dry polymer solids.

EXAMPLE

Preparation Examples, Examples, and Comparative Examples are given below by way of illustration and not by way of limitation. In Examples, all parts and % are by weight.

Example 1

A polymerization vessel equipped with a stirrer, condenser, thermometer and nitrogen gas inlet was purged with nitrogen and charged with 33 parts of deionized water, 15 parts of vinyl chloride, and 50 parts (active ingredient 30%) of JONCRYL JDX-6500 (by BASF AG, acrylic ester oligomer), which were heated at 60° C. with stirring. Further a solution of 0.1 part of ammonium persulfate (initiator) in 1 part of deionized water was added whereupon polymerization reaction was run.

When the internal pressure of the polymerization vessel reached 0 MPa, the residual monomer was removed in vacuum to 1,000 ppm. The vessel was then cooled below 40° C., yielding a polymer emulsion having a solid content 30%, pH 7.5 and a viscosity of 10 mPa-s at 23° C. as measured by a Brookfield viscometer. By GPC, the emulsion was identified to be a vinyl chloride resin emulsion.

Examples 2 to 7 and Comparative Examples 1 to 7

Vinyl chloride resin emulsions were prepared by carrying out polymerization as in Example 1 while using the formulation shown in Tables 1 and 2.
[Evaluation Methods]
Measurement of Solid Content A test was carried out by weighing about 1 g of a vinyl chloride resin emulsion in an aluminum foil dish, holding the dish in a dryer for heating at 105-110° C. for 1 hour, taking out of the dryer, allowing to cool down in a desiccator, and measuring the weight of the dry sample.

A solid content was computed according to the equation:

$$R = \frac{D-A}{W-A} \times 100 \quad \text{[Mathematical Formula 1]}$$

wherein R is a solid content (%), W is the weight (g) of the aluminum dish containing the sample prior to drying, A is the weight (g) of the aluminum dish, and D is the weight (g) of the aluminum dish containing the dry sample. Note that the aluminum dish had a diameter of 70 mm and a height of 12 mm.
pH Measurement A vinyl chloride resin emulsion was directly measured for pH by a pH meter according to the pH measurement method of JIS Z8802.
Viscosity Measurement by Brookfield Viscometer A vinyl chloride resin emulsion was measured for viscosity by a Brookfield viscometer (BM type, No. 1 rotor, 6 rpm) while maintaining the liquid temperature at 23±5° C.
Average Particle Size It was measured by a light scattering particle size meter.
Sample Preparation
1. A sample was weighed in a disposable cup and diluted with deionized water at 25° C.
2. The diluted sample was filtered through a 300-mesh filter cloth.
   Liquid temperature: 25° C.
   Number of accumulations: 100
   Number of measurement: 1
Measurement
   Once a proper concentration was confirmed, measurement was made under the above conditions. The result of measurement was confirmed satisfactory.
Polymerization Stability A vinyl chloride resin emulsion was applied onto a glass plate by a doctor knife of 6 mm. A coating was visually observed to confirm whether or not agglomerates were present.
   ○: no agglomerates found
   x: agglomerates formed
I. Evaluation of Performance as Gravure Printing Ink A vinyl chloride resin emulsion was adjusted to a solid concentration of 20% and mixed with 5% of a commercially available pigment DISPERS RED SD-1011 (DIC Corp.) and 75% of water to give a sample A.

Sample A was set on a table-top printer GRAVO-PROOF CM (Nissio Gravure Co., Ltd.), where the printing roll was rotated one turn to print on a commercially available paper sheet.
   a) Water Resistance
   The printed paper was set on a color fastness rubbing tester (Yasuda Seiki Seisakusho, Ltd.). Using water-wetted gauze, the rubbing test was carried out 25 cycles. Judgment was made according to the following criterion.
   ○: no color transfer to gauze
   Δ: some color transfer
   x: complete color transfer, printed area color faded
   b) Humidity Resistance
   The printed paper was held at 50° C. and humidity 90% for one day, after which it was judged according to the following criterion.
   ○: no bleeding in printed area
   Δ: some bleeding from printed area
   x: full bleeding
   c) Gloss
   The printed area was measured for gloss by a gloss meter PG-1M (Nippon Denshoku Co., Ltd.), with a value at 60° being read out. Judgment was made according to the following criterion.
   ○: gloss value of 90 or higher
   Δ: gloss value from 70 to less than 90
   x: gloss value of less than 70 d) Alcohol Resistance

The printed paper was set on a color fastness rubbing tester (Yasuda Seiki Seisakusho, Ltd.). Using ethanol-wetted gauze, the rubbing test was carried out 25 cycles. Judgment was made according to the following criterion.

○: no color transfer to gauze
Δ: some color transfer
x: complete color transfer, printed area color faded II. Evaluation of Performance as Inkjet Ink Preparation of Ink A vinyl chloride resin emulsion was adjusted to a solid concentration of 20% and mixed with 20% of carbon black MA100 (Mitsubishi Paper Mills, Ltd.) and 60% of water to give a sample B.

e) Tone

Sample B as prepared was coated on a commercially available paper sheet by a bar coater No. 4 so as to give a dry coating weight of 4 g/m² and dried at 40° C. for 30 seconds. The coated paper and the sample as prepared were visually observed for outer appearance, and judged according to the following criterion.

○: equivalent tone
Δ: lack of black density
x: tone changed f) Adhesion

Sample B as prepared was coated on a flexible vinyl chloride film (Superfilm Nontack E, Okamoto Co., Ltd.) by a bar coater No. 4 so as to give a dry coating weight of 4 g/m² and dried at 40° C. for 30 seconds. Adhesive tape (Cellotape® by Nichiban Co., Ltd.) was applied to the coated film and peeled therefrom, and judgment was made according to the following criterion.

○: no peel
Δ: some peel
x: complete peel g) Dispersion (Aging Stability)

Sample B as prepared was allowed to stand at room temperature for one week, after which sedimentation with time was visually observed, and judged according to the following criterion.

○: no sediment
Δ: sedimented, but restorable by agitation
x: sedimented, not restorable III. Evaluation of Performance as Receiving Layer of Recording Sheet Preparation of Receiving Layer A vinyl chloride resin emulsion was coated on a commercially available paper sheet by a bar coater No. 4 and dried at 40° C. for 30 seconds, giving sample C.

h) Color Development

Using a printer EPSON PM-800C, three colors of yellow, cyan and magenta were printed on sample C. The density of each color was judged by visual observation according to the following criterion.

○: clearly printed without decolorization
Δ: partially decolorized
x: decolorized and color faded i) Ink Absorption The printed paper was set on a color fastness rubbing tester (Yasuda Seiki Seisakusho, Ltd.). Using water-wetted gauze, the rubbing test was carried out 25 cycles. Judgment was made according to the following criterion.

○: no color transfer to gauze
Δ: some color transfer
x: complete color transfer, printed area color faded j) Humidity Resistance The printed paper was held at 50° C. and humidity 90% for one day, after which it was judged according to the following criterion.

○: no bleeding in printed area
Δ: some bleeding from printed area
x: full bleeding

TABLE 1

| | Components (pbw) | Example 1 | 2 | 3 | 4 | 5 | 6 | 7 |
|---|---|---|---|---|---|---|---|---|
| A | JONCRYL JDX-6500 | 50 | 100 | 300 | | 100 | 100 | 100 |
| | JONCRYL JDX-6102B | | | | | | | |
| | JONCRYL HPD-96J | | | | 100 | | | |
| | JONCRYL 52J | | | | | | | |
| B | Vinyl chloride | 100 | 100 | 100 | 100 | 80 | 80 | 75 |
| C | Vinyl acetate | | | | | 20 | | |
| | Ethyl acrylate | | | | | | 20 | 20 |
| | Acrylic acid | | | | | | | 5 |
| Water-soluble polymer | PVA-117 | | | | | | | |
| | PVA-617 | | | | | | | |
| Emulsifier | Noigen XL-6190 | | | | | | | |
| | Pelex SS-L | | | | | | | |
| Solid content (%) | | 30 | 30 | 30 | 30 | 30 | 30 | 30 |
| pH | | 7.5 | 7.5 | 7.5 | 7.5 | 6.5 | 7.5 | 4.5 |
| Viscosity (mPa·s) | | 10 | 10 | 10 | 300 | 1000 | 500 | 1500 |
| Average particle size (nm) | | 80 | 30 | 30 | 150 | 400 | 300 | 600 |
| Polymerization stability | | ○ | ○ | ○ | ○ | ○ | ○ | ○ |
| Performance evaluation I | a) Water resistance | ○ | ○ | ○ | ○ | ○ | ○ | ○ |
| | b) Humidity resistance | ○ | ○ | ○ | ○ | ○ | ○ | ○ |
| | c) Gloss | ○ | ○ | ○ | ○ | ○ | ○ | ○ |
| | d) Alcohol resistance | ○ | ○ | Δ | Δ | Δ | Δ | Δ |
| II | e) Tone | ○ | ○ | ○ | ○ | ○ | ○ | ○ |
| | f) Adhesion | ○ | ○ | Δ | ○ | ○ | Δ | Δ |
| | g) Dispersion (aging stability) | ○ | ○ | ○ | ○ | ○ | ○ | ○ |
| III | h) Coating weight (g/m² as solid) | 3.4 | 3.3 | 3.7 | 3.3 | 4.0 | 3.4 | 3.0 |
| | i) Color development | ○ | ○ | Δ | ○ | ○ | Δ | Δ |
| | j) Ink absorption | ○ | ○ | ○ | Δ | Δ | ○ | ○ |

TABLE 1-continued

|  | | Example | | | | | | |
|---|---|---|---|---|---|---|---|---|
| Components (pbw) | | 1 | 2 | 3 | 4 | 5 | 6 | 7 |
| (water resistance) k) Ink absorption (humidity resistance) | | ○ | ○ | ○ | ○ | ○ | ○ | ○ |

TABLE 2

| | Components (pbw) | Comparative Example | | | | | | |
|---|---|---|---|---|---|---|---|---|
| | | 1 | 2 | 3 | 4 | 5 | 6 | 7 |
| A | JONCRYL JDX-6500 | 30 | 525 | | | | | |
| | JONCRYL JDX-6102B | | | | | | | 100 |
| | JONCRYL HPD-96J | | | | | | | |
| | JONCRYL 52J | | | | | | 100 | |
| B | Vinyl chloride | 100 | 100 | 100 | 100 | 75 | 100 | 100 |
| C | Vinyl acetate | | | | | | | |
| | Ethyl acrylate | | | | | 20 | | |
| | Acrylic acid | | | | | 5 | | |
| Water-soluble polymer | PVA-117 | | | | 10 | | | |
| | PVA-617 | | | | | 10 | | |
| Emulsifier | Noigen XL-6190 | | | | | | 3 | |
| | Pelex SS-L | | | | | | 3 | |
| Solid content (%) | | 29 | 28 | 30 | 30 | 30 | 25 | 26 |
| pH | | 7.5 | 7.5 | 6.5 | 6.5 | 5 | 7.5 | 7.5 |
| Viscosity (mPa·s) | | 10 | 50 | 2000 | 3000 | 100 | 10 | 300 |
| Average particle size (nm) | | 500 | 30 | 500 | 600 | 250 | 150 | 200 |
| Polymerization stability | | X | X | ○ | ○ | ○ | X | X |
| Performance evaluation | I a) Water resistance | Δ | Δ | Δ | Δ | X | X | Δ |
| | b) Humidity resistance | Δ | Δ | Δ | Δ | X | Δ | Δ |
| | c) Gloss | X | Δ | X | X | X | Δ | X |
| | d) Alcohol resistance | Δ | X | Δ | Δ | Δ | X | Δ |
| | II e) Tone | X | X | X | X | X | Δ | Δ |
| | f) Adhesion | X | X | X | X | X | X | X |
| | g) Dispersion (aging stability) | X | Δ | X | X | Δ | X | X |
| | III h) Coating weight (g/m² as solid) | 3.2 | 3.4 | 3.5 | 3.3 | 3.2 | 3.7 | 3.4 |
| | i) Color development | Δ | X | Δ | Δ | Δ | Δ | Δ |
| | j) Ink absorption (water resistance) | Δ | Δ | Δ | Δ | X | X | X |
| | k) Ink absorption (humidity resistance) | Δ | Δ | Δ | Δ | X | X | Δ |

JONCRYL JDX-6500: BASF AG, acrylic oligomer, number average molecular weight = 10,000
JONCRYL JDX-6102B: BASF AG, acrylic oligomer, number average molecular weight = 60,000
JONCRYL HPD-96J: BASF AG, styrene-acrylic oligomer, number average molecular weight = 16,500
JONCRYL 52J: BASF AG, styrene-acrylic oligomer, number average molecular weight = 1,700
PVA-117: Kuraray Co., Ltd., saponification value 98.5, degree of polymerization 1,700
PVA-617: Kuraray Co., Ltd., saponification value 95.0, degree of polymerization 1,700
Noigen XL-6190: Dai-ichi Kogyo Seiyaku Co., Ltd., nonionic emulsifier
Pelex SS-L: Kao Corp., anionic emulsifier

The invention claimed is:

1. A vinyl chloride resin emulsion obtained from emulsion polymerization which is conducted by
    charging a polymerization vessel with a mixture consisting of:
        deionized water,
        100 parts by weight of a monomeric composition consisting of
            (B) a vinyl chloride monomer or
            (B) a vinyl chloride monomer and (C) an ethylenically unsaturated monomer copolymerizable therewith, a proportion of (B) to (C) being between 70:30 to 100:0 in a weight ratio, and
        40 to 300 parts by weight of a styrene-acrylic acid ester oligomer and/or acrylic acid ester oligomer having a number average molecular weight of 5,000 to 50,000;
    heating at 40 to 80° C., and
    adding a polymerization initiator to run the polymerization reaction to form a vinyl chloride resin emulsion so that the residue on evaporation is 10 to 50% by weight.

2. The vinyl chloride resin emulsion of claim 1 wherein the amount of the styrene-acrylic acid ester oligomer and/or acrylic acid ester oligomer is 50 to 300 parts by weight per 100 parts by weight of the monomeric composition.

3. The vinyl chloride resin emulsion of claim 1 wherein the amount of the styrene-acrylic acid ester oligomer and/or acrylic acid ester oligomer is 100 to 300 parts by weight per 100 parts by weight of the monomeric composition.

4. The vinyl chloride resin emulsion of claim 1 wherein the monomeric composition consists of (A) a vinyl chloride monomer.

5. An aqueous ink composition comprising the vinyl chloride resin emulsion of claim 1.

6. The aqueous ink composition of claim 5 wherein the vinyl chloride resin emulsion is present in an amount of 2 to 30% by weight as solids, the composition further comprising 3 to 40% by weight of a colorant, 0 to 60% by weight of a water-soluble organic solvent, and 5 to 95% by weight of water.

7. A recording sheet comprising a coating of the vinyl chloride resin emulsion of claim 1.

8. The recording sheet of claim 7 wherein said coating is formed of a composition comprising 2 to 30% by weight as solids of the vinyl chloride resin emulsion, 0 to 30% by weight of a pigment, and the balance of water or a water-soluble organic solvent.

9. The recording sheet of claim 7 wherein said coating forms a receiving layer.

10. The recording sheet of claim 9 wherein said coating is formed of a composition comprising 2 to 30% by weight as solids of the vinyl chloride resin emulsion, 0 to 30% by weight of a pigment, and the balance of water or a water-soluble organic solvent.

* * * * *